US010333346B2

(12) United States Patent
Guo et al.

(10) Patent No.: US 10,333,346 B2
(45) Date of Patent: Jun. 25, 2019

(54) RESILIENCY CONTROLLER FOR VOLTAGE REGULATION IN MICROGRIDS

(71) Applicant: NEC Laboratories America, Inc., Princeton, NJ (US)

(72) Inventors: Feng Guo, Santa Clara, CA (US); Ratnesh Sharma, Fremont, CA (US)

(73) Assignee: NEC Corporation (JP)

( * ) Notice: Subject to any disclaimer, the term of this patent is extended or adjusted under 35 U.S.C. 154(b) by 193 days.

(21) Appl. No.: 15/489,805

(22) Filed: Apr. 18, 2017

(65) Prior Publication Data

US 2017/0317498 A1 Nov. 2, 2017

Related U.S. Application Data

(60) Provisional application No. 62/330,457, filed on May 2, 2016.

(51) Int. Cl.
| | | |
|---|---|---|
| G05B 15/02 | (2006.01) | |
| H02J 13/00 | (2006.01) | |
| H02J 3/38 | (2006.01) | |
| H02J 3/46 | (2006.01) | |
| H02J 3/12 | (2006.01) | |
| H02J 3/18 | (2006.01) | |
| H02J 3/50 | (2006.01) | |
| H02J 3/00 | (2006.01) | |

(52) U.S. Cl.
CPC .......... *H02J 13/0006* (2013.01); *G05B 15/02* (2013.01); *H02J 3/12* (2013.01); *H02J 3/18* (2013.01); *H02J 3/382* (2013.01); *H02J 3/50* (2013.01); *H02J 2003/007* (2013.01); *Y02E 40/30* (2013.01); *Y02E 40/72* (2013.01); *Y02E 60/76* (2013.01); *Y04S 10/123* (2013.01); *Y04S 40/22* (2013.01)

(58) Field of Classification Search
CPC ........................... G05B 15/02; H02J 13/0006; H02J 2003/007; H02J 3/12; H02J 3/18; H02J 3/382; H02J 3/50; Y02E 40/30; Y02E 40/72; Y02E 60/76; Y04S 10/123; Y04S 40/22
See application file for complete search history.

(56) References Cited

U.S. PATENT DOCUMENTS

| | | | |
|---|---|---|---|
| 7,983,799 B2 * | 7/2011 | Bose ......................... | H02J 3/06 700/287 |
| 10,148,089 B2 * | 12/2018 | Sun ......................... | G05B 17/02 |

(Continued)

OTHER PUBLICATIONS

Shi et al., "Adaptive Control of Energy Storage for Voltage Regulation in Distribution System", IEEE International Conference on Smart Energy Grid Engineering. Aug. 28, 2013. pp. 1-7.

*Primary Examiner* — Abdelmoniem I Elamin
(74) *Attorney, Agent, or Firm* — Joseph Kolodka (57) ABSTRACT

A computer-implemented method for controlling voltage fluctuations of a microgrid including a plurality of distributed generators (DGs) is presented. The computer-implemented method includes collecting, by a resiliency controller including at least a voltage control module, measurement data from the microgrid, using, by a reactive power estimator, reactive power estimations to calculate an amount of reactive power for each of the DGs, and using a dynamic droop control unit to distribute the reactive power to each of the DGs of the microgrid.

20 Claims, 8 Drawing Sheets

(56) References Cited

U.S. PATENT DOCUMENTS

| | | | |
|---|---|---|---|
| 2013/0300196 A1* | 11/2013 | Clark | H02J 4/00 307/26 |
| 2015/0054339 A1* | 2/2015 | Zhao | H02J 3/16 307/24 |
| 2015/0311716 A1* | 10/2015 | He | H02J 3/16 700/287 |
| 2016/0204611 A1* | 7/2016 | Chambon | H02J 3/1835 307/26 |
| 2016/0313716 A1* | 10/2016 | Chen | H02J 4/00 |
| 2016/0329711 A1* | 11/2016 | Majumder | H02J 3/38 |
| 2016/0363949 A1* | 12/2016 | Zimmanck | G05B 13/021 |
| 2017/0077700 A1* | 3/2017 | Sun | G05B 17/02 |
| 2018/0138705 A1* | 5/2018 | Gu | H02J 3/12 |

\* cited by examiner

RESILIENCY CONTROLLER FOR VOLTAGE REGULATION IN MICROGRIDS

RELATED APPLICATION INFORMATION

This application claims priority to Provisional Application No. 62/330,457, filed on May 2, 2016, incorporated herein by reference in its entirety.

BACKGROUND

Technical Field

The present invention relates to power systems and, more particularly, to a resiliency controller for voltage regulation in micro-grids.

Description of the Related Art

With the increasing penetration of renewables, the traditional distribution system design philosophy is being challenged. One concern is the voltage rise challenge caused by reverse power flow when the solar photovoltaic (PV) generation substantially exceeds the load demand. Existing solutions of these voltage issues include either restricting PV output or tripping it with over-voltage/under-voltage relays, both of which are disruptive.

Penetration of renewable energy sources (RESs) in power systems has been increasing dramatically during the last few years. The PV system is the most commonly observed form of RESs in the low-voltage distribution system. Nonetheless, the negative impact of PV grid integration has drawn concerns.

Traditionally, distribution systems were designed to operate in radial configurations with a single power source at a substation. Power flows in a single direction from the substation to a remote end and voltage level drops along the distribution feeder. However, with high penetration of PV generation, power flow and voltage profiles in distribution system change significantly. When PV generation substantially exceeds local load at the point of common coupling (PCC), surplus power from PV flows back to the grid and produces reverse power flows, which may cause the voltage rise challenge mentioned above.

Further, due to high variability of solar energy availability (e.g., cloud transient effect), PV generation can fluctuate at a very high ramping rate, thus leading to power quality and even voltage stability issues. The aforementioned voltage challenges make it difficult for the distribution utilities to operate their feeders without violating the voltage limits stipulated by local standards.

SUMMARY

A computer-implemented method for controlling voltage fluctuations of a microgrid including a plurality of distributed generators (DGs) is presented. The method includes collecting, by a resiliency controller including at least a voltage control module, measurement data from the microgrid, using, by a reactive power estimator, reactive power estimations to calculate an amount of reactive power for each of the DGs, and using a dynamic droop control unit to distribute the reactive power to each of the DGs of the microgrid.

A system for controlling voltage fluctuations of a microgrid including a plurality of distributed generators (DGs) is presented. The system includes a memory and a processor in communication with the memory, wherein the processor is configured to collect, by a resiliency controller including at least a voltage control module, measurement data from the microgrid, use, by a reactive power estimator, reactive power estimations to calculate an amount of reactive power for each of the DGs, and use a dynamic droop control unit to distribute the reactive power to each of the DGs of the microgrid.

A non-transitory computer-readable storage medium comprising a computer-readable program for controlling voltage fluctuations of a microgrid including a plurality of distributed generators (DGs) is presented, wherein the computer-readable program when executed on a computer causes the computer to perform the steps of collecting, by a resiliency controller including at least a voltage control module, measurement data from the microgrid, using, by a reactive power estimator, reactive power estimations to calculate an amount of reactive power for each of the DGs, and using a dynamic droop control unit to distribute the reactive power to each of the DGs of the microgrid.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In one aspect, the method, system, and non-transitory computer-readable storage medium include a framework for distribution network voltage regulation by integrating a solar photovoltaic (PV) system with a distributed energy storage system (ESS) and adaptively dispatching the ESS. In the exemplary embodiments of the present invention, the voltage and current phasors at the point of common coupling (PCC) are continuously monitored to establish a real-time Thevenin equivalent of the distribution grid. Based on this equivalent, the maximum and minimum power injections allowed at PCC are continuously tracked. The voltage violation margins at PCC are calculated and the ESS is controlled adaptively to prevent the occurrence of one or more voltage violations. The proposed methods and systems can also be used to mitigate the effects of sudden changes in PV outputs.

In one aspect, the method, system, and non-transitory computer-readable storage medium include a resiliency controller with a voltage control algorithm. The resiliency controller first collects system-level information of the microgrid. Then the resiliency controller uses advanced reactive power estimation, by a reactive power estimator, to accurately calculate the amount of reactive power needed in the system. Finally, the resiliency controller utilizes a dynamic droop control unit to distribute reactive power to each of the Distributed Generators (DGs) in the microgrid.

In one aspect, the method, system, and non-transitory computer-readable storage medium utilize the existing DGs in the microgrid to realize the voltage regulation, and no additional reactive power compensation equipment is needed, which saves cost of the system. The exemplary embodiments of the present invention can collect system level information for voltage regulation. Compared to the local information based method, the exemplary embodiments of the present invention can achieve a higher voltage regulation quality. By proper distribution of the reactive power, the exemplary embodiments of the present invention can also maximize the usage of renewable energies and minimize the usage of fossil-fuel generators. This can significantly reduce the operational cost of the microgrid.

In one aspect, the method, system, and non-transitory computer-readable storage medium integrate an energy storage system (ESS) with a PV. A preventive control framework is proposed for distribution network voltage regulation through adaptive control of ESS charge/discharge. In the proposed framework, voltage and current at the point of common coupling (PCC) are continuously monitored to establish a real-time equivalent circuit of the distribution network. Based on this equivalent, the maximum and minimum power injections allowed at PCC are continuously tracked. The proposed scheme solves at least two fundamental issues: identifying possible voltage violations in advance and identifying an amount of power at which ESS should be dispatched to prevent one or more voltage violations.

In one aspect, the method, system, and non-transitory computer-readable storage medium include a measurement-based adaptive control approach for Grid Energy Storage (GES) to stabilize voltage in the power grid. A real-time system modeling technique is developed to model power system as a Thevenin equivalent and Kalman filter/Recursive Least Squares approach is used to identify its parameters. Based on the equivalent model, the maximum power that could be transferred by the system is tracked, voltage stability index is tracked, and the voltage sensitivity factor is calculated. Based on the calculated index/sensitivity factor, grid-scale energy storage can be dispatched to provide voltage support to the microgrid, as well as to prevent voltage instability.

In one aspect, the method, system, and non-transitory computer-readable storage medium include local measurements only and do not require any remote communication infrastructure. The control strategy is simple and highly reliable since no offline study and no manual operation is needed. The exemplary embodiments of the present invention greatly reduce the cost for both electricity suppliers and customers. The examples described herein reduce the need for system maintenance, reduce the possibility of equipment failure, and reduce the needs for power curtailments and load shedding. With this invention, grid-scale energy storage can be a valuable asset for the power system for enhancing its reliability and stability.

Microgrids are electric networks that are capable of deriving power from a number of sources including the conventional power grid, localized power generating capabilities and alternative power sources such as solar arrays and wind turbines. The microgrid can aggregate power from a number of sources, converting the different formats of power derived from multiple and diverse sources to common voltage and frequency formats that can be subsequently distributed to one or a number of loads. In addition, the microgrid can maintain the reliability of power to one or a number of loads in the face of changing power levels that are derived from the multiple and diverse sources. A microgrid can be coordinated to provide power from a variety of power sources and to provide power with greater reliability. For example, a microgrid can provide an alternate source of power to a site when there is an interruption in the power delivered by the conventional utility power grid. A microgrid also can provide an alternate source of power, such as power from a renewable energy source, when renewable energy is preferred over power delivered by the conventional utility power grid. The power that the microgrid supplies to a site may be derived from a variety of sources including energy storage devices, alternative energy sources such wind or solar power, or from burning conventional fossil fuels.

Figure 1:
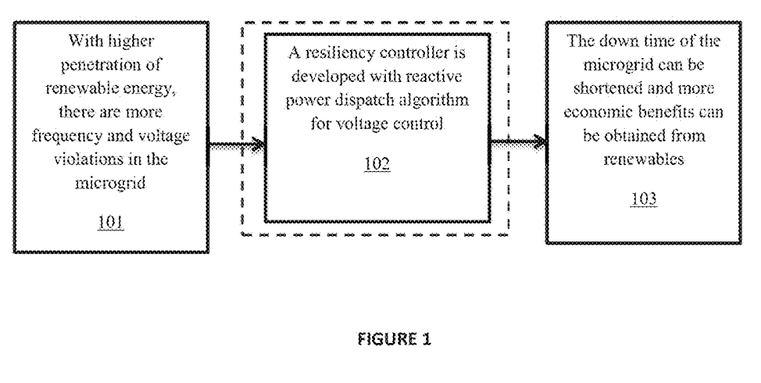
FIG. 1 is a block/flow diagram of high-level voltage regulation in a distribution system, in accordance with embodiments of the present invention.

FIG. 1 is a block/flow diagram of high-level voltage regulation in a distribution system, in accordance with embodiments of the present invention.

At block 101, with higher penetration of renewable energy, there are more frequency and voltage violations in the microgrid.

At block 102, a resiliency controller is developed with a reactive power dispatch algorithm for voltage control, according to the embodiments of the present invention.

At block 103, the down time of the microgrid can be shortened and more economic benefits can be obtained from renewables.

Figure 2:
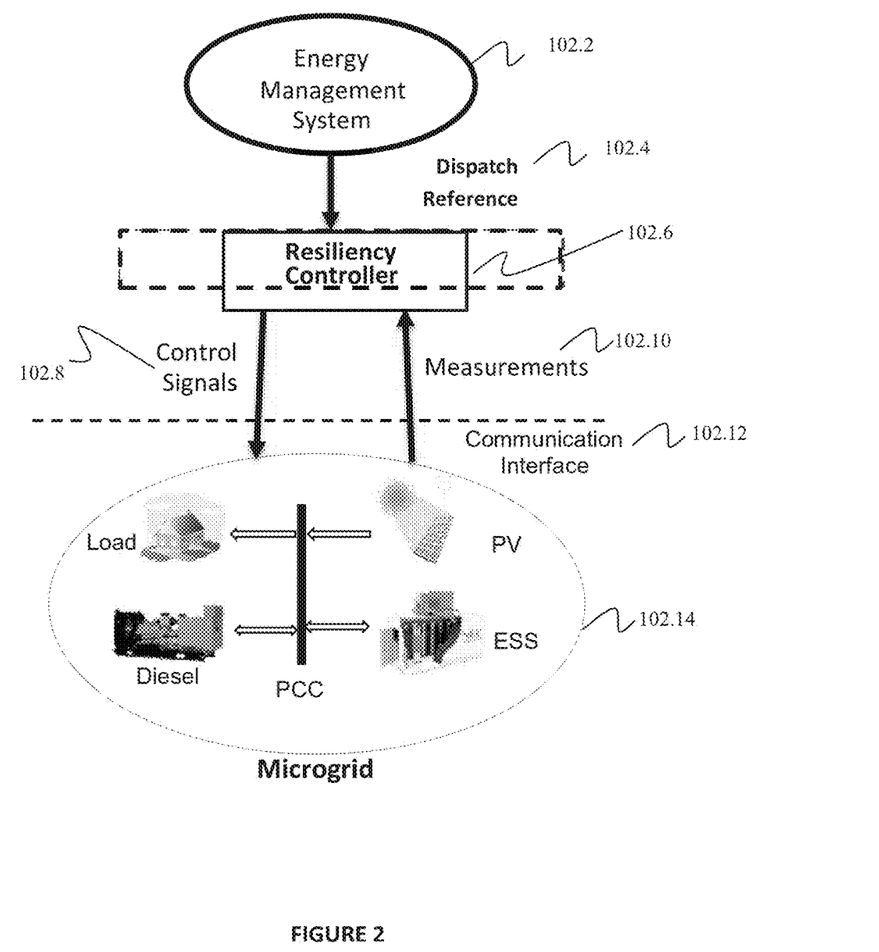
FIG. 2 is a block/flow diagram of a resiliency controller in a microgrid, in accordance with embodiments of the present invention.

In FIG. 2, 102.2 is the energy management system, which sends out the active power dispatch reference 102.4 of each distributed generator (DG) in a microgrid 102.14 to the resiliency controller 102.6. Meanwhile, the resiliency controller 102.6 collects the measurement data 102.10 from the microgrid 102.14 through a communication interface 102.12. Based on the dispatch reference 102.4 and measurement data 102.10, the resiliency controller 102.6 sends out the control signals 102.8 to the Distributed Generators (DGs) in the microgrid 102.14 through the same communication interface 102.12.

Regarding 102.2, the Energy Management System is in charge of the economic operation of the microgrid. The Energy Management System needs to realize functions such as unit commitment, economic dispatch, renewable forecasting, etc. The Energy Management System sends out active power dispatch references to the resiliency controller 102.6 for each DG in the microgrid 102.14.

Regarding 102.14, the DGs in the microgrid can be divided into at least three categories:
  C1: Battery Energy Storage System (ESS);
  C2: Traditional generators using fossil fuels, such as the diesel generator;
  C3: Renewable generators, such as PV and Wind;

DGs in C1 and C2 are equipped with droop control in their local controllers. DGs' output active power is related to the microgrid frequency, while DGs' output reactive power is related to the microgrid voltage.

The equations to describe these two relationships are shown below.

$$f_{DG} = f_{DG}^* + k_{f\_DG}(P_{DG}^* - P_{DG}).$$

$$V_{DG} = V_{DG}^* + k_{v\_DG}(Q_{DG}^* - Q_{DG}).$$

Where $f_{DG}$ is the output frequency of the DG, $f_{DG}^*$ is the reference frequency of the DG, $k_{f\_DG}$ is the frequency droop coefficient, $P_{DG}^*$ is the reference active power of the DG, and $P_{DG}$ is the output active power of the DG.

Meanwhile, $V_{DG}$ is the output frequency of the DG, $V_{DG}^*$ is the reference frequency of the DG, $k_{v\_DG}$ is the frequency droop coefficient, $Q_{DG}^*$ is the reference active power of the DG, and $Q_{DG}$ is the output active power of the DG.

DGs in C3 are equipped with Maximum Power Point Tracking (MPPT) algorithm to harvest the maximum amount of energy under the given weather condition. Meanwhile, they can also be equipped with droop control in their local controllers.

Figure 3:
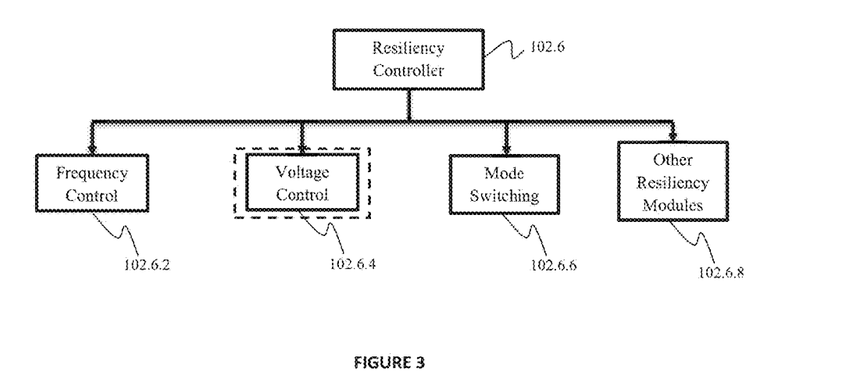
FIG. 3 is a block/flow diagram of the components of the resiliency controller of FIG. 2 in the microgrid, in accordance with embodiments of the present invention.

Regarding 102.6, the schematic of the resiliency controller is shown in FIG. 3. The resiliency controller 102.6 includes multiple functional modules to control the DGs in the microgrid 102.14 utilizing system-level information. The frequency control module 102.6.2 utilizes a dynamic droop control algorithm to regulate the microgrid frequency. The voltage control module 102.6.4 utilizes a reactive power management algorithm to regulate the microgrid voltage. The mode switching module 102.6.6 is in charge of the microgrid operation status transition between the grid-tied mode and islanded mode. In addition, there are other resiliency modules 102.6.8 to enhance the resilience of the microgrid.

Figure 4:
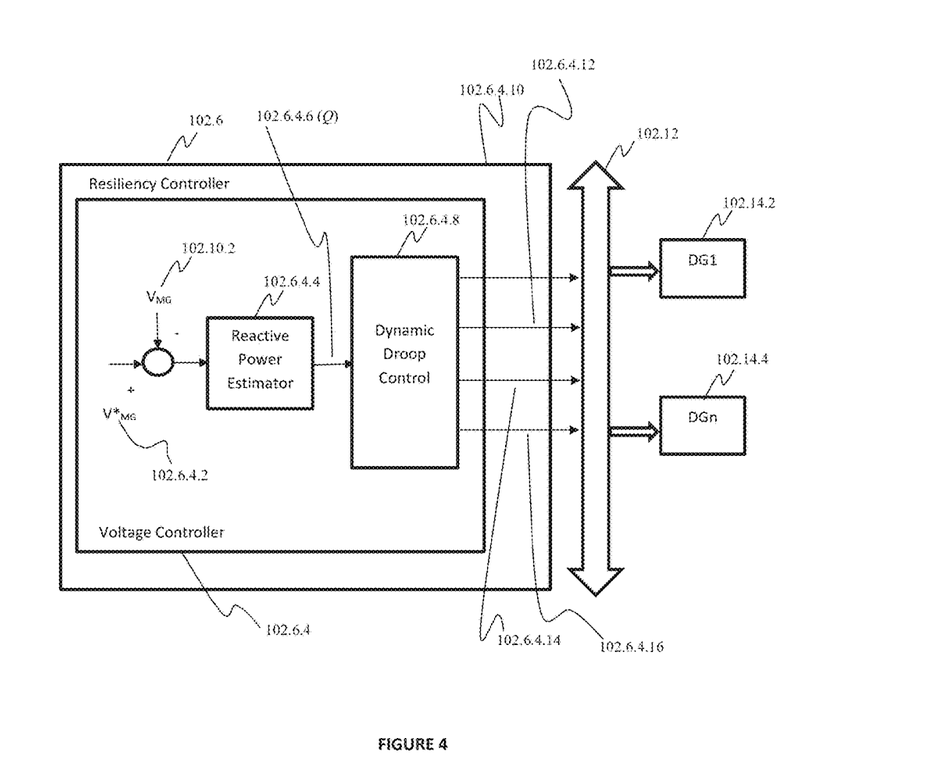
FIG. 4 is a block/flow diagram of a voltage control unit in the resiliency controller of FIG. 2, in accordance with embodiments of the present invention.

Regarding 102.6.4, the schematic of the voltage control module is shown in FIG. 4. In this module, the reference of the microgrid voltage $V_{MG}^*$ 102.6.4.2 is compared with the voltage $V_{MG}$ 102.10.2 measured from the microgrid. The error signal is sent to a reactive power estimator 102.6.4.4, which is used to calculate the amount of reactive power needed in the microgrid Q 102.6.4.6. This reactive power 102.6.4.6 is sent to the dynamic droop control unit 102.6.4.8. The dynamic droop control unit 102.6.4.8 dispatches the amount of reactive power 102.6.4.6 between the distributed generators and identifies the amount of power needed for each DG, from $Q_{DG1}$ 102.6.4.14 to $Q_{DGn}$ 102.6.4.16, which satisfies the following equation:

$$Q = Q_{DG1} + \ldots + Q_{DGn}.$$

In addition, the dynamic droop control unit 102.6.4.8 determines the slope rates of droop curves for each DG from $k_{v\_DG1}$ 102.6.4.10 to $k_{v\_DGn}$ 102.6.4.12.

The final active power references and slope rates of droop curves for each DG are sent to each DG from DG1 102.14.2 to DGn 102.14.4 through the communication link 102.12.

Figure 5:
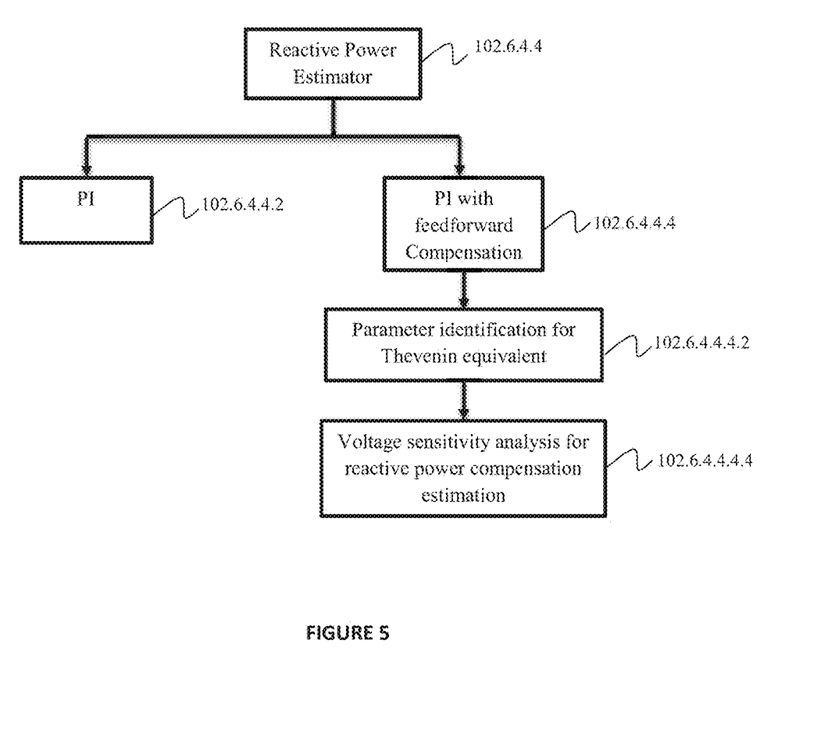
FIG. 5 is a block/flow diagram illustrating different approaches in a reactive power estimator, in accordance with embodiments of the present invention.

Regarding 102.6.4.4, the function of this module is to estimate the amount of reactive power needed, so the microgrid ac bus voltage can be regulated within a safety range. Different algorithms can be used for the estimation, such as 1) Proportional-Integral (PI) controller 102.6.4.4.2 and 2) PI controller with feedforward compensation 102.6.4.4.4 based on the microgrid network topology.

Figure 6:
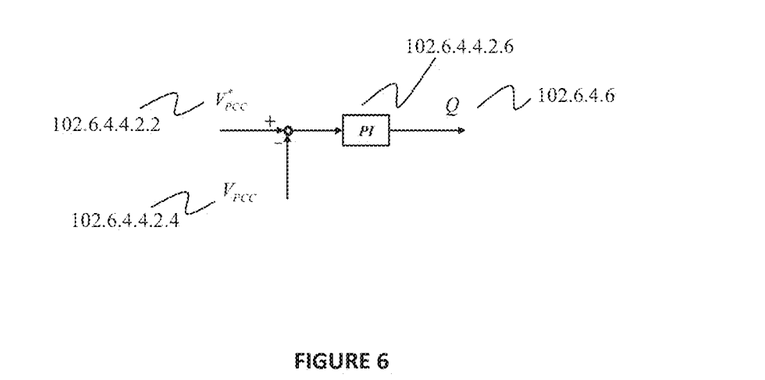
FIG. 6 is a block/flow diagram of the reactive power estimator using a proportional-integral (PI) controller, in accordance with embodiments of the present invention.

Regarding 102.6.4.4.2, in this approach, a Proportional-Integral (PI) controller is utilized to estimate the reactive power Q 102.6.4.6. The schematic is shown in FIG. 6. $V_{PCC}^*$ 102.6.4.4.2.2 is the reference voltage at the point of common coupling (PCC), while $V_{PCC}$ 102.6.4.4.2.4 is the feedback voltage at PCC. 102.6.4.4.2.6 is the PI controller, and its transfer function in s-domain is shown in the equation below.

$$PI(s) = k_p + \frac{k_i}{s}$$

Figure 7:
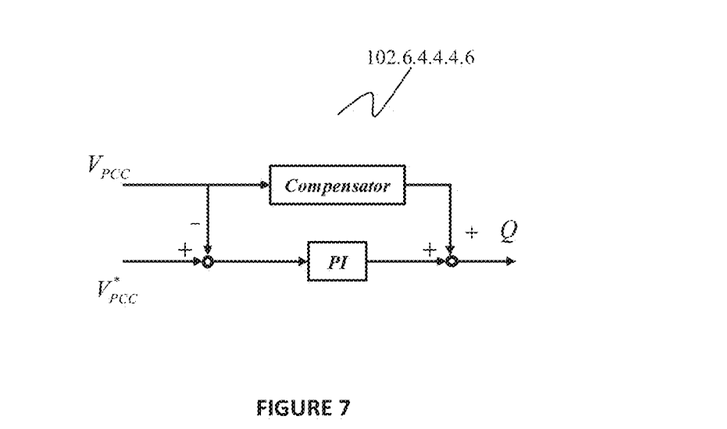
FIG. 7 is a block/flow diagram of the reactive power estimator using a PI controller with feed-forward compensation, in accordance with embodiments of the present invention.

Regarding 102.6.4.4.4, this approach is similar to the approach shown in 102.6.4.4.2, but a feed-forward compensation unit 102.6.4.4.4.6 is added to estimate the value of Q. The schematic of this approach is shown in FIG. 7.

There are two steps in the proposed compensator 102.6.4.4.4.2. The first step is to identify the Thevenin equivalent parameter of the system using Kalman Filter (KF), and the second step is to calculate the reactive power Q using voltage sensitivity matrix.

Figure 8:
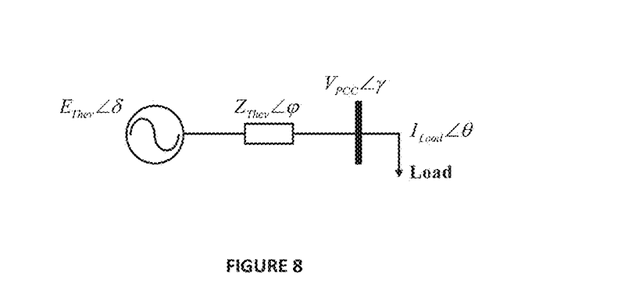
FIG. 8 is a block/flow diagram of a Thevenin equivalent circuit of the microgrid, in accordance with embodiments of the present invention.

Regarding 102.6.4.4.4.2, in order to estimate the reactive power needed for voltage compensation, the entire microgrid is first simplified and represented by a Thevenin equivalent circuit shown in FIG. 8.

In this equivalent circuit of FIG. 8, $V_{PCC}$, $I_{Load}$, $\gamma$ and $\theta$ can be calculated by the local measurement data, while $E_{Thev}$, $Z_{Thev}$, $\delta$ and $\varphi$ need to be identified by the KF.

The KF is an optimal state estimator for dynamical systems. It estimates the system unknown states efficiently in a recursive way. A general discrete state-space representation of a dynamic system is shown below:

$$x_{k+1} = A_k x_k + w_k$$

$$z_k = H_k x_k + v_k$$

where $x_k$ is the state vector; $A_k$ is the state transition matrix; $z_k$ is the measurement vector; $H_k$ is the observation matrix; $w_k$ and $v_k$ are the process noise and measurement noise, respectively.

Noise $w_k$ and $v_k$ are assumed to be independent of each other and their covariance matrixes are given below:

$$E(w_k w_k^T) = W_k$$

$$E(v_k v_k^T) = V_k$$

Define:

$$E_R = E_{Thev} \cos(\delta)$$

$$E_I = E_{Thev} \sin(\delta)$$

$$V_R = V_{PCC} \cos(\gamma)$$

$$V_I = V_{PCC} \sin(\gamma)$$

$$R = E_{Thev} \cos(\varphi)$$

$$X = E_{Thev} \sin(\varphi)$$

In this invention, a sliding window containing four measurement points is used for the parameter estimation.

In particular, the vectors/matrixes used in parameter identification are defined as follows:

$$x_k = \begin{bmatrix} E_R^k \\ E_I^k \\ R^k \\ X^k \end{bmatrix}_{4\times 1}$$

$$z_k = \begin{bmatrix} V_R^{k1} \\ V_I^{k1} \\ \vdots \\ V_R^{k4} \\ V_I^{k4} \end{bmatrix}_{8\times 1}$$

$$A_k = \begin{bmatrix} 1 & & & \\ & 1 & & \\ & & 1 & \\ & & & 1 \end{bmatrix}_{4\times 4}$$

$$H_k = \begin{bmatrix} 1 & 0 & -I_R^{k1} & I_I^{k1} \\ 0 & 1 & -I_I^{k1} & -I_R^{k1} \\ \vdots & \vdots & \vdots & \vdots \\ 1 & 0 & -I_R^{k4} & I_I^{k4} \\ 0 & 1 & -I_I^{k4} & -I_R^{k4} \end{bmatrix}_{8\times 4}$$

where $(\cdot)^k$ refers to the unknown parameters at the k th time step (window); $(\cdot)^{ki}$ refers to the i th measurement point at the k th time step (window).

The unknown parameters at each time instant can be calculated by applying recursively the following set of update equations:

$$P_{k+1} = A_{k+1} P_k A_{k+1}^T + V_k$$

$$K_{k+1} = P_{k+1} H_{k+1}^T [H_{k+1} P_{k+1} H_{k+1}^T + W_{k+1}]^-$$

$$x_{k+1} A_{k+1} x_k K_{k+1} [z_{k+1} - H_{k+1} A_k x_k]$$

$$P_{k+1} = P_{k+1} - K_{k+1} H_{k+1} P_{k+1}$$

where $K_k$ is the Kalman gain at time step k.

Regarding 102.6.4.4.4.4, the active power and the reactive power transferred from the Thevenin equivalent source to the PCC bus are given by the following equations:

$$P = \frac{1}{R^2 + X^2}(RE_{Thev}^2 - RE_{Thev} V_{PCC} \cos(\delta - \gamma) + XE_{Thev} V_{PCC} \sin(\delta - \gamma))$$

$$Q = \frac{1}{R^2 + X^2}(XE_{Thev}^2 - XE_{Thev} V_{PCC} \cos(\delta - \gamma) - RE_{Thev} V_{PCC} \sin(\delta - \gamma))$$

Consider the small disturbance around the equilibrium operation point, the above equation can be linearized to obtain the following relationship:

$$\Delta Q = -\frac{E_{Thev0}}{Z_{Thev}} \sin(\delta_0 - \gamma_0 + \varphi) \Delta V_{PCC}$$

where $E_{Thev0}$, $\delta_0$ and $\gamma_0$ are the equilibrium operation point.

Therefore, after the PCC bus voltage disturbance is obtained, the estimated reactive power change can be calculated based on the above equation.

Figure 9:
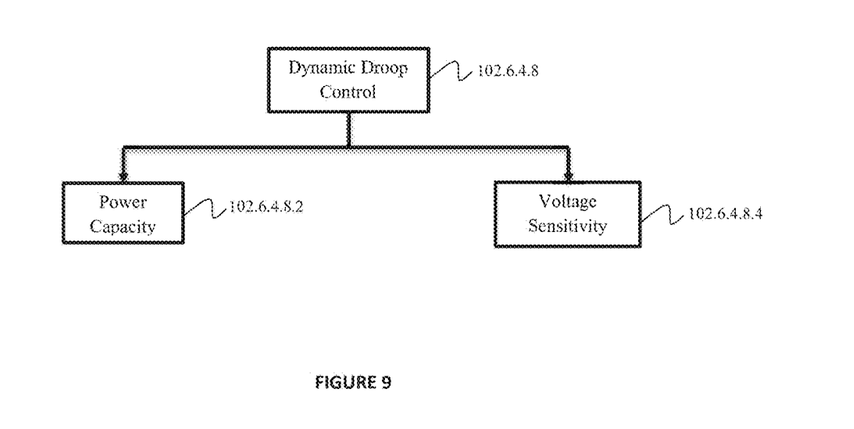
FIG. 9 is a block/flow diagram of a dynamic droop control unit, in accordance with embodiments of the present invention.

Regarding 102.6.4.8, the function of this module is to distribute the amount of reactive power between DGs in the microgrid. Different algorithms can be used for the dynamic droop control (FIG. 9).

Regarding 102.6.4.8.2 in FIG. 9, if power capacity analysis is used for dynamic droop control, the droop coefficient and the reactive power reference of each DG is determined by its maximum reactive power capacity, as shown below.

$$k_{v\_DG1}\sqrt{S_1^2 - P_1^2} = \ldots = k_{v\_DGi}\sqrt{S_i^2 - P_i^2} = \ldots = k_{v\_DGn}\sqrt{S_n^2 - P_n^2}$$

$$Q_{DGi} = \frac{1/k_{v\_DGi}}{\sum_{1}^{n}(1/k_{v\_DGi})} Q$$

where i=1~n, and $S_i$ and $P_i$ are the apparent power and active power of DG i, respectively.

Regarding 102.6.4.8.4 in FIG. 9, if voltage sensitivity analysis is used for dynamic droop control, the droop coefficient and the reactive power reference of each DG is determined by the voltage sensitivity factor.

The power flow equation in the microgrid can be listed as:

$$\begin{cases} P_i = \sum_{k=1}^{m} |V_i||V_k|(G_{ik}\cos(\theta_i - \theta_k) + B_{ik}\sin(\theta_i - \theta_k)) \\ Q_i = \sum_{k=1}^{m} |V_i||V_k|(G_{ik}\sin(\theta_i - \theta_k) - B_{ik}\cos(\theta_i - \theta_k)) \end{cases}$$

where m is the number of buses in the microgrid;

$P_i$ and $Q_i$ are the real and reactive power at bus i, respectively;

$G_{ik}$ and $B_{ik}$ are the conductance and susceptance of the line admittance between bus i and k, respectively;

$V_i$ and $V_k$ are the voltage magnitude at bus i and bus k, respectively; and $\theta_i$ and $\theta_k$ are the voltage phase angle of bus i and bus k, respectively.

The Jacobian matrix is obtained by linearizing the power flow equations:

$$\begin{bmatrix} \Delta P \\ \Delta Q \end{bmatrix} = \begin{bmatrix} \frac{\partial P}{\partial \theta} & \frac{\partial P}{\partial V} \\ \frac{\partial Q}{\partial \theta} & \frac{\partial Q}{\partial V} \end{bmatrix} \begin{bmatrix} \Delta \theta \\ \Delta V \end{bmatrix}$$

By inverting the Jacobian matrix, the voltage sensitivity matrix can be derived as:

$$\begin{bmatrix} \Delta \theta \\ \Delta V \end{bmatrix} = \begin{bmatrix} \frac{\partial P}{\partial \theta} & \frac{\partial P}{\partial V} \\ \frac{\partial Q}{\partial \theta} & \frac{\partial Q}{\partial V} \end{bmatrix}^{-1} \begin{bmatrix} \Delta P \\ \Delta Q \end{bmatrix}$$

Assume the active power is constant, the voltage magnitude deviation at bus i can be calculated as:

$$\Delta V_i = \sum_k D_{ik} \Delta Q_k$$

where $$D = \left( \frac{\partial Q}{\partial V} - \frac{\partial Q}{\partial \theta} \left( \frac{\partial Q}{\partial \theta} \right)^{-1} \frac{\partial P}{\partial V} \right)^{-1},$$

and $D_{ik}$ is the sensitivity factor representing the derivation of voltage at bus i caused by the derivation of reactive power at bus k.

If the PCC bus is specified as bus p, based on the sensitivity factors, the reactive power reference of each DG can be distributed as $$Q_{DGi} = \frac{D_{pi}}{\sum_{k=1}^{n} D_{pk}} Q$$

where i is the bus number that has DGs connected and participated in reactive power regulation.

The droop coefficient of each DG participated in reactive power regulation can be determined as:

$$\frac{k_{v\_DG1}}{D_{1p}} = \ldots = \frac{k_{v\_DGi}}{D_{ip}} = \ldots = \frac{k_{v\_DGn}}{D_{np}}$$

Figure 10:
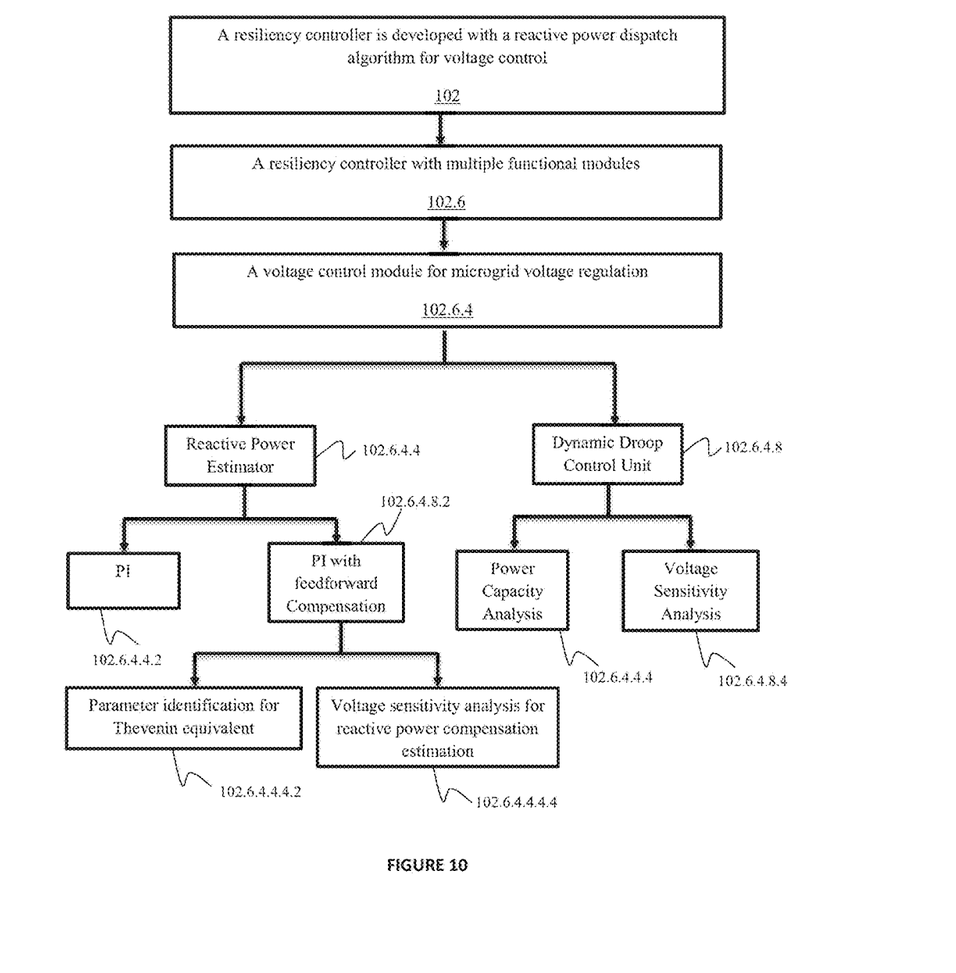
FIG. 10 is a block/flow diagram of a method for regulating voltage via a resiliency controller including a reactive power estimator and a dynamic droop control unit, in accordance with embodiments of the present invention.

FIG. 10 is a block/flow diagram of a method for regulating voltage via a resiliency controller including a reactive power estimator and a dynamic droop control unit, in accordance with embodiments of the present invention.

At block 102, a resiliency controller is developed with a reactive power dispatch algorithm for voltage control.

At block 102.6, the resiliency controller is provided with multiple functional modules.

At block 102.6.4, the resiliency controller includes at least a voltage control module for microgrid voltage regulation.

At block 102.6.4.4, the voltage control module includes a reactive power estimator 102.6.4.4.

At block 102.6.4.8, the voltage control module includes a dynamic droop control unit 102.6.4.8.

The reactive power estimator 102.6.4.4 can be executed by either the PI 102.6.4.4.2 or by the PI with feed-forward compensation 102.6.4.8.2. The PI with feed-forward compensation 102.6.4.8.2 can be executed by either parameter identification for Thevenin equivalent 102.6.4.4.4.2 or by voltage sensitivity analysis 102.6.4.4.4.4 for reactive power compensation estimation.

The dynamic droop control unit 102.6.4.8 can be executed by power capacity analysis 102.6.4.4.4 or by voltage sensitivity analysis 102.6.4.8.4.

Therefore, in summary, the steps of the exemplary embodiments of the present invention are: 1) collect the system-level information of the microgrid, 2) use advanced reactive power estimation technology to accurately calculate the amount of reactive power needed in the system, and 3) utilize the dynamic droop control technology to distribute reactive power among all the DGs in the microgrid.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein; for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Additionally, as used herein, the term "exemplary" is intended to mean serving as an illustration or example of something, and is not intended to indicate a preference.

As used herein, the terms "component", "agent", and "system" are intended to encompass computer-readable data storage that is configured with computer-executable instructions that cause certain functionality to be performed when executed by a processor. The computer-executable instructions may include a routine, a function, or the like. In another example, a "component", "agent", or "system" may be hardware that is configured to perform certain functionality, such as a field programmable gate array (FPGA), an embedded processor interfaced to a power control hardware device, or the like. It is also to be understood that a component, agent, or system may be localized on a single device or distributed across several devices.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for controlling voltage fluctuations of a microgrid including a plurality of distributed generators (DGs), the method comprising:

collecting, by a resiliency controller including at least a voltage control module, measurement data from the microgrid;

using, by a reactive power estimator, reactive power estimations to calculate an amount of reactive power for each of the DGs; and using a dynamic droop control unit to distribute the reactive power to each of the DGs of the microgrid, the dynamic droop control unit employing either power capacity analysis or voltage sensitivity analysis to determine a droop coefficient and a reactive power reference of each of the DGs, the power capacity analysis employed to determine a maximum reactive power capacity and the voltage sensitivity analysis employed to determine a voltage sensitivity factor.

2. The method of claim 1, wherein the resiliency controller is executed by a reactive power dispatch algorithm for controlling the voltage fluctuations.

3. The method of claim 1, wherein the voltage control module utilizes a reactive power management unit to regulate a microgrid voltage.

4. The method of claim 1, wherein the resiliency controller further include a frequency control module and a mode switching module.

5. The method of claim 4, wherein the frequency control module utilizes the dynamic droop control unit to regulate a microgrid frequency.

6. The method of claim 5, wherein the dynamic droop control unit dispatches the reactive power between the DGs and identifies an amount of power for operating each of the DGs.

7. The method of claim 6, wherein the dynamic droop control unit further determines slope rates of droop curves for each of the DGs.

8. The method of claim 1, wherein the maximum reactive power capacity is determined by:

$$k_{v\_DG1}\sqrt{S_1^2 - P_1^2} = \ldots = k_{v\_DGi}\sqrt{S_i^2 - P_i^2} = \ldots = k_{v\_DGn}\sqrt{S_n^2 - P_n^2}$$

$$Q_{DGi} = \frac{1/k_{v\_DGi}}{\sum_1^n (1/k_{v\_DGi})} Q$$

where i=1~n, and $S_i$ and $P_i$ are apparent power and active power of DG i, respectively, $k_{v\_DG}$ is a frequency droop coefficient, $Q_{DG}$ is output active power of the DG, and Q is reactive power.

9. The method of claim 1, wherein the voltage sensitivity factor is determined by power flow equations:

$$\begin{cases} P_i = \sum_{k=1}^{m} |V_i||V_k|(G_{ik}\cos(\theta_i - \theta_k) + B_{ik}\sin(\theta_i - \theta_k)) \\ Q_i = \sum_{k=1}^{m} |V_i||V_k|(G_{ik}\sin(\theta_i - \theta_k) - B_{ik}\cos(\theta_i - \theta_k)) \end{cases}$$

where m is a number of buses in the microgrid, $P_i$ and $Q_i$ are real and reactive power at bus i, respectively, $G_{ik}$ and $B_{ik}$ are conductance and susceptance of line admittance between bus i and k, respectively, $V_i$ and $V_k$ are voltage magnitude at bus i and bus k, respectively, and $\theta_i$ and $\theta_j$ are voltage phase angle of bus i and bus k, respectively.

10. A system for controlling voltage fluctuations of a microgrid including a plurality of distributed generators (DGs), the system comprising:
a memory; and
a processor in communication with the memory, wherein the processor is configured to:
collect, by a resiliency controller including at least a voltage control module, measurement data from the microgrid;
use, by a reactive power estimator, reactive power estimations to calculate an amount of reactive power for each of the DGs; and
use a dynamic droop control unit to distribute the reactive power to each of the DGs of the microgrid, the dynamic droop control unit employing either power capacity analysis or voltage sensitivity analysis to determine a droop coefficient and a reactive power reference of each of the DGs, the power capacity analysis employed to determine a maximum reactive power capacity and the voltage sensitivity analysis employed to determine a voltage sensitivity factor.

11. The system of claim 10, wherein the resiliency controller is executed by a reactive power dispatch algorithm for controlling the voltage fluctuations.

12. The system of claim 10, wherein the voltage control module utilizes a reactive power management unit to regulate a microgrid voltage.

13. The system of claim 10, wherein the resiliency controller further include a frequency control module and a mode switching module.

14. The system of claim 13, wherein the frequency control module utilizes the dynamic droop control unit to regulate a microgrid frequency.

15. The system of claim 14, wherein the dynamic droop control unit dispatches the reactive power between the DGs and identifies an amount of power for operating each of the DGs.

16. The system of claim 15, wherein the dynamic droop control unit further determines slope rates of droop curves for each of the DGs.

17. The system of claim 10, wherein the maximum reactive power capacity is determined by:

$$k_{v\_DG1}\sqrt{S_1^2 - P_1^2} = \ldots = k_{v\_DGi}\sqrt{S_i^2 - P_i^2} = \ldots = k_{v\_DGn}\sqrt{S_n^2 - P_n^2}$$

$$Q_{DGi} = \frac{1/k_{v\_DGi}}{\sum_{1}^{n}(1/k_{v\_DGi})}Q$$

where i=1~n, and $S_i$ and $P_i$ are apparent power and active power of DG i, respectively, $k_{v\_DG}$ is a frequency droop coefficient, $Q_{DG}$ is output active power of the DG, and Q is reactive power.

18. The system of claim 10, wherein the voltage sensitivity factor is determined by power flow equations:

$$\begin{cases} P_i = \sum_{k=1}^{m}|V_i||V_k|(G_{ik}\cos(\theta_i - \theta_k) + B_{ik}\sin(\theta_i - \theta_k)) \\ Q_i = \sum_{k=1}^{m}|V_i||V_k|(G_{ik}\sin(\theta_i - \theta_k) - B_{ik}\cos(\theta_i - \theta_k)) \end{cases}$$

where m is a number of buses in the microgrid, $P_i$ and $Q_i$ are real and reactive power at bus i, respectively, $G_{ik}$ and $B_{ik}$ are conductance and susceptance of line admittance between bus i and k, respectively, $V_i$ and $V_k$ are voltage magnitude at bus i and bus k, respectively, and $\theta_i$ and $\theta_i$ are voltage phase angle of bus i and bus k, respectively.

19. A non-transitory computer-readable storage medium comprising a computer-readable program for controlling voltage fluctuations of a microgrid including a plurality of distributed generators (DGs), wherein the computer-readable program when executed on a computer causes the computer to perform the steps of:
collecting, by a resiliency controller including at least a voltage control module, measurement data from the microgrid;
using, by a reactive power estimator, reactive power estimations to calculate an amount of reactive power for each of the DGs; and
using a dynamic droop control unit to distribute the reactive power to each of the DGs of the microgrid, the dynamic droop control unit employing either power capacity analysis or voltage sensitivity analysis to determine a droop coefficient and a reactive power reference of each of the DGs, the power capacity analysis employed to deteuxiine a maximum reactive power capacity and the voltage sensitivity analysis employed to determine a voltage sensitivity factor.

20. The non-transitory computer-readable storage medium of claim 19,
wherein the maximum reactive power capacity is determined by:

$$\begin{cases} P_i = \sum_{k=1}^{m}|V_i||V_k|(G_{ik}\cos(\theta_i - \theta_k) + B_{ik}\sin(\theta_i - \theta_k)) \\ Q_i = \sum_{k=1}^{m}|V_i||V_k|(G_{ik}\sin(\theta_i - \theta_k) - B_{ik}\cos(\theta_i - \theta_k)) \end{cases}$$

where i=1~n, and $S_i$ and $P_i$ are apparent power and active power of DG i, respectively, $k_{v\_DG}$ is a frequency droop coefficient, $Q_{DG}$ is output active power of the DG, and Q is reactive Dower; and
wherein the voltage sensitivity factor is determined by power flow equations:

$$\begin{cases} P_i = \sum_{k=1}^{m}|V_i||V_k|(G_{ik}\cos(\theta_i - \theta_k) + B_{ik}\sin(\theta_i - \theta_k)) \\ Q_i = \sum_{k=1}^{m}|V_i||V_k|(G_{ik}\sin(\theta_i - \theta_k) - B_{ik}\cos(\theta_i - \theta_k)) \end{cases}$$

where m is a number of buses in the microgrid, $P_i$ and $Q_i$ are real and reactive power at bus i, respectively, $G_{ik}$, and $B_{ik}$ are conductance and susceptance of line admittance between bus i and k, respectively, $V_i$ and $V_k$ are voltage magnitude at bus i and bus k, respectively, and $\theta_i$ and $\theta_i$ are voltage phase angle of bus i and bus k, respectively.

\* \* \* \* \*